United States Patent
Mohan et al.

(10) Patent No.: US 11,449,483 B1
(45) Date of Patent: Sep. 20, 2022

(54) REQUEST PROCESSING USING DYNAMIC ITEM DATA STRUCTURES

(71) Applicant: Dell Products L.P., Round Rock, TX (US)

(72) Inventors: Prashanth Mohan, Bangalore (IN); Niall Brady, Dublin (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/219,078

(22) Filed: Mar. 31, 2021

(51) Int. Cl.
    *G06F 16/00* (2019.01)
    *G06F 16/22* (2019.01)
    *G06F 16/29* (2019.01)

(52) U.S. Cl.
    CPC ...... *G06F 16/2228* (2019.01); *G06F 16/2282* (2019.01); *G06F 16/29* (2019.01)

(58) Field of Classification Search
    CPC ............ G06Q 10/087; G06Q 30/0623; G06Q 30/0633; G06Q 30/0641; G06F 16/2228; G06F 16/2282; G06F 16/29
    See application file for complete search history.

(56) References Cited

U.S. PATENT DOCUMENTS

2021/0312531 A1* 10/2021 McGinnis .......... G06Q 30/0623

OTHER PUBLICATIONS

Bill of materials, https://en.wikipedia.org/w/index.php?title=Bill_of_materials&oldid=1012289226 (last visited Mar. 26, 2021).

\* cited by examiner

*Primary Examiner* — Dinku W Gebresenbet
(74) *Attorney, Agent, or Firm* — Ryan, Mason & Lewis, LLP

(57) ABSTRACT

Methods, apparatus, and processor-readable storage media for request processing using dynamic item data structures are provided herein. An example method includes an item data structure comprising an item identifier for a given item and a plurality of global identifiers, wherein a given one of the global identifiers is indicative of a corresponding one of a plurality of different variations of the given item based on a particular combination of values associated with the given global identifier, wherein the particular combination of values is specified for a set of parameters associated with the given item; dynamically identifying one of the global identifiers in the item data structure based at least in part on one or more user inputs indicative of a value for at least one of the parameters; and processing a request for the given item based at least in part on the identified global identifier.

20 Claims, 8 Drawing Sheets

| ITEM ID | ITEM DESCRIPTION | GLOBAL ID | FIXED-DEFINITION VARIANT 1 COUNTRY | FIXED-DEFINITION VARIANT 2 SEGMENT | VARIANT TYPE VALUE | SUB-VARIANT TYPE VALUE |
|---|---|---|---|---|---|---|
| 123456 | MY DYNAMIC ITEM | 10101 | US | LARGE ENTERPRISE | COLOR: BLUE | SIZE: LARGE |
| | | 20202 | US | PUBLIC SECTOR | COLOR: BLUE | SIZE: MEDIUM |
| | | 30303 | US | SMB | COLOR: RED | WEIGHT: 1KG |
| | | 40404 | JP | LARGE ENTERPRISE | COLOR: RED | WEIGHT: 1KG |
| | | 50505 | JP | SMB | COLOR: BLACK | SIZE: SMALL |
| | | 60606 | DE | PUBLIC SECTOR | COLOR: RED | WEIGHT: 2KG |
| | | 70707 | DE | PUBLIC SECTOR | COLOR: RED | WEIGHT: 1KG |

CREATE QUOTE > CONFIGURE AND PRICE OFFER

300

| | |
|---|---|
| CUSTOMER: | ACME GMBH ... 306 |
| | CUSTOMER NUMBER: 789456 ⎫ |
| | CUSTOMER SEGMENT: ENTERPRISE ⎬ 308 |
| | CUSTOMER COUNTRY: DE ⎭ |
| PRODUCT: | STORAGE-AS-A-SERVICE-PREPAID ▼ 302 |
| | ITEM ID: 123456  304 |
| STORAGE CLASS: | STANDARD ▼ 310 |
| MAX STORAGE: | 50Tb —— 150Tb  (100Tb) 312 |
| DURATION: | 1 MONTH —— 10 YEARS (48 MONTHS) 314 |
| LIST PRICE: | €5760.00  316 |

ITEM — 322

| item_id | item description |
|---|---|
| 123456 | STORAGE-AS-A-SERVICE-PREPAID |

VARIANT TYPE — 328

| variant_type_id | variant type description |
|---|---|
| 22222 | STORAGE CLASS |
| 22223 | MAX STORAGE |

GLOBAL ID — 324

| golbal_id | country_code | customer segment | variant_type_value | sub_variant type value |
|---|---|---|---|---|
| 10101 | DE | ENTERPRISE | 12111 | 12115 |
| 20202 | DE | ENTERPRISE | 12111 | 12116 |
| 30303 | DE | ENTERPRISE | 12111 | 12117 |
| 40404 | FR | ENTERPRISE | 12112 | 12115 |
| 50505 | FR | COMMERCIAL | 12113 | |

VARIANT TYPE VALUE — 326, 330

| variant_type_id | variant_type_value_id | variant_type_value_str | variant_type_value_num | variant_type_value_uom |
|---|---|---|---|---|
| 22222 | 12111 | STANDARD | | |
| 22222 | 12112 | NEARLINE | | |
| 22222 | 12113 | COLDLINE | | |
| 22222 | 12114 | ARCHIVE | | |
| 22223 | 12115 | | 50 | Tb |
| 22223 | 12116 | | 100 | Tb |
| 22223 | 12117 | | 150 | Tb |
| 22223 | 12118 | | 200 | Tb |
| 22223 | 12119 | | 250 | |

PRICING TIER — 332

| pricing_tier | uom | start_value | end_value |
|---|---|---|---|
| 13131 | MONTH | 1 | 12 |
| 14141 | MONTH | 13 | 36 |
| 15151 | MONTH | 37 | 120 |

LIST PRICE — 334

| item_id | global_id | pricing_tier | price_per_uom |
|---|---|---|---|
| 123456 | 10101 | 13131 | 80 |
| 123456 | 10101 | 14141 | 100 |
| 123456 | 10101 | 15151 | 120 |
| ... | ... | ... | ... |

REQUEST PROCESSING USING DYNAMIC ITEM DATA STRUCTURES

FIELD

The field relates generally to information processing systems, and more particularly to the processing of data structures in such information processing systems.

BACKGROUND

Traditionally, information technology (IT) stacks have been developed using data structures based on a Bill of Materials (BOM) model as the best way to manage configurable items. Data structures based on the BOM model have significant limitations when applied to, for example, complex and configurable technologies, such as storage-as-a-service, infrastructure-as-a-service, and/or platform-as-a-service, also referred to herein as "as-a-service" technologies.

SUMMARY

Illustrative embodiments of the disclosure provide techniques for request processing using dynamic item data structures. An exemplary computer-implemented method includes maintaining an item data structure comprising an item identifier for a given item and a plurality of global identifiers, wherein a given one of the global identifiers is indicative of a corresponding one of a plurality of different variations of the given item based on a particular combination of values associated with the given global identifier, wherein the particular combination of values is specified for a set of parameters associated with the given item; dynamically identifying one of the global identifiers in the item data structure based at least in part on one or more user inputs indicative of a value for at least one of the parameters in the set; and processing a request for the given item based at least in part on the identified global identifier.

Illustrative embodiments can provide significant advantages relative to conventional request processing techniques. For example, challenges associated with the configurability and complexity of software services are overcome in one or more embodiments by implementing a dynamic and configurable item data structure that reduces the amount of data operations and is more efficient to maintain than conventional techniques.

These and other illustrative embodiments described herein include, without limitation, methods, apparatus, systems, and computer program products comprising processor-readable storage media.

BRIEF DESCRIPTION OF THE DRAWINGS

FIG. 2 shows an example of a dynamic item data structure in an illustrative embodiment.

FIGS. 3A and 3B show an example graphical user interface and a corresponding dynamic item data structure, respectively, in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
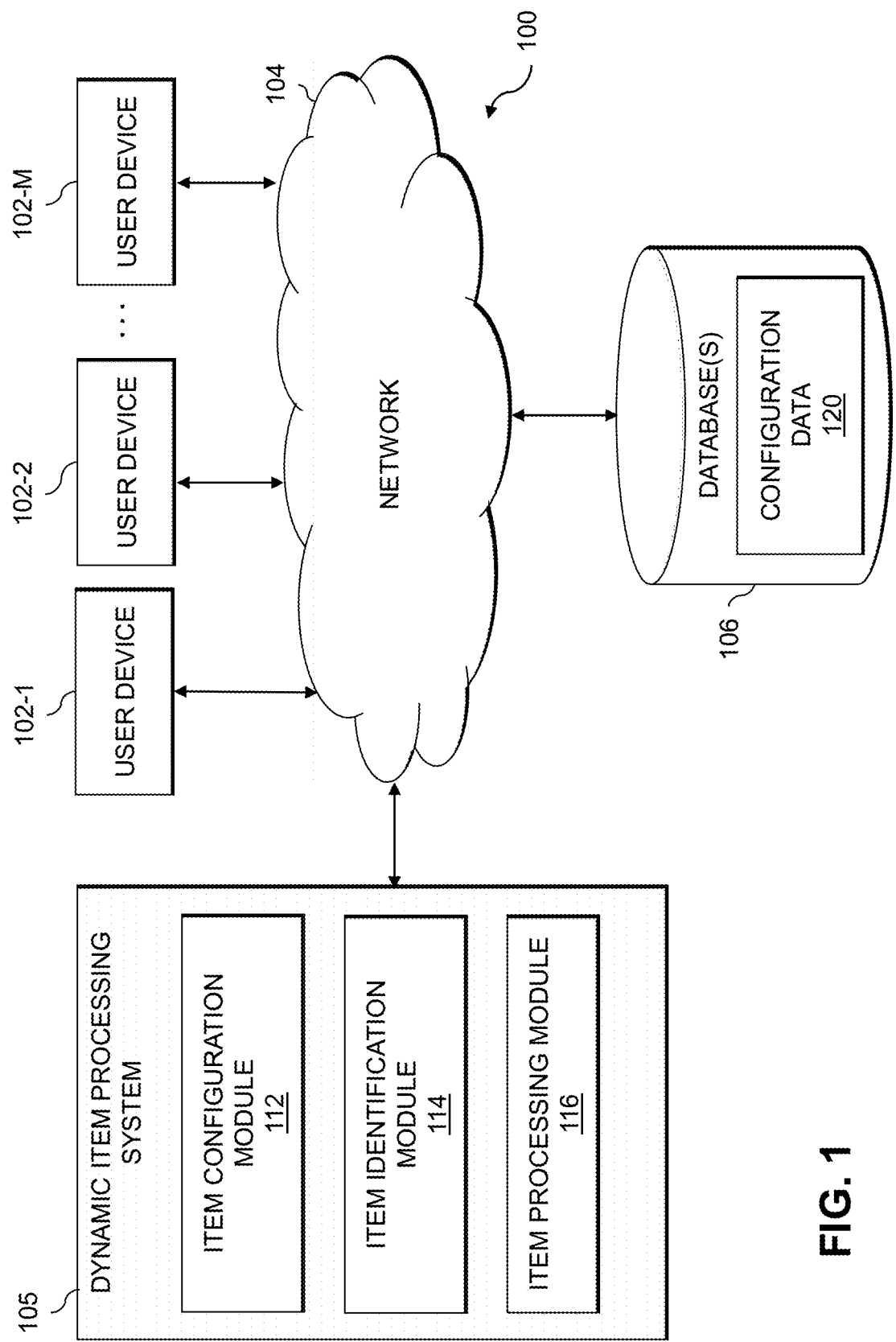
FIG. 1 shows an information processing system configured for request processing using dynamic item data structures in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is dynamic item processing system 105.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, dynamic item processing system 105 can have at least one associated database 106 configured to store configuration data 120 pertaining to, for example, different configurations of items (e.g., service items).

An example database 106, such as depicted in the present embodiment, can be implemented using one or more storage systems associated with dynamic item processing system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with dynamic item processing system 105 are one or more input-output devices, which illustratively comprise keyboards, displays or other types of input-output devices in any combination. Such input-output devices can be used, for example, to support one or more user interfaces to dynamic item processing system 105, as well as to support communication between dynamic item processing system 105 and other related systems and devices not explicitly shown.

Additionally, dynamic item processing system 105 in the FIG. 1 embodiment is assumed to be implemented using at least one processing device. Each such processing device generally comprises at least one processor and an associated memory, and implements one or more functional modules for controlling certain features of dynamic item processing system 105.

More particularly, dynamic item processing system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows dynamic item processing system 105 to communicate over the network 104 with the user devices 102, and illustratively comprises one or more conventional transceivers.

The dynamic item processing system 105 further comprises an item configuration module 112, an item identification module 114, and an item processing module 116.

It is to be appreciated that this particular arrangement of modules 112, 114 and 116 illustrated in the dynamic item processing system 105 of the FIG. 1 embodiment is presented by way of example only, and alternative arrangements can be used in other embodiments. For example, the functionality associated with the modules 112, 114 and 116 in other embodiments can be combined into a single module, or separated across a larger number of modules. As another example, multiple distinct processors can be used to implement different ones of the modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for implementing dynamic item data structures involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of dynamic item processing system 105 and database(s) 106 can be on and/or part of the same processing platform.

An exemplary process utilizing modules 112, 114 and 116 of an example dynamic item processing system 105 in computer network 100 will be described in more detail with reference to the flow diagram of FIG. 5.

Creating individual items to represent different variations of a service results in redundant data (such as for purposes of data analytics, for example), as each of the items have a minimum set of attributes that need to be populated. There is also unnecessary overhead within various processes, such as, for example, offer management processes. Conventional structures are generally designed to support optionality and cardinality configuration rules, but present many technical challenges when applied to the complexity and configurability that are ubiquitous with as-a-service and managed service offers, for example. Additionally, the existing structures must be passed in their entirety from system to system in order to represent a particular customer request. This naturally results in complex integration, redundant data processing, and increased likelihood of data synchronization issues across end-to-end stacks.

Exemplary embodiments described herein provide an item data structure that can dynamically adapt to support a wide variety of complex requests for service items while avoiding issues and constraints encountered in traditional IT stacks when responding to such requests. In this context, the term "request" is intended to be broadly construed so as to encompass, for example, proposals and requests related to acquiring services (for example, storage as-a-service).

Such dynamic item data structures can be applied to process requests related to, for example, an as-a-service or a managed service offer. As-a-service and managed service offers allow multiple variants of a given service item. The variants may be based on, for example, one or more of the following characteristics: customer type/segment, customer location, technology to be managed, whether a technology is owned by a customer or by a third-party, existing technology environment or infrastructure, expected type of workload of technology to be consumed or managed, one or more customer agreements, usage patterns, preferences for balancing cost and service availability, balancing responsibilities with respect to the service provider, and preferences for fixed costs versus variability. At least some example embodiments allow a dynamic item data structure to efficiently encapsulate these and other variants.

Additionally, in at least some embodiments, a dynamic item data structure can be implemented in such a way so as to present a user with a particular set of eligible variants (for example, based on a location of the user) and to enforce compatibility between selections made across different dimensions. The dynamic item data structure may be efficiently communicated through different processing systems, including, for example, cloud computing systems or services (for example, Amazon Web Services (AWS)), systems owned and managed by third parties, Enterprise Resource Planning (ERP) software, and finance software. The underlying complexity of the configured request can be hidden or partially accessed depending on the specific scope of the system processing it.

Referring now to FIG. 2, a representation of a dynamic item data structure 200 is shown in an illustrative embodiment. The dynamic item data structure 200 includes an item identifier (ID) (e.g., a string of numbers and/or letters), an item description, and a plurality of global IDs. The dynamic item data structure 200 is configured with two fixed-definition variant types, however, in other examples there may be zero or more fixed-definition variant types. Specifically, the example shown in FIG. 2 includes a fixed-definition variant 1, which specifies different countries for the item, and fixed-definition variant 2, which specifies different customer segments for the item.

In the example shown in FIG. 2, the dynamic item data structure 200 includes respective fields for a variant type value and a sub-variant type value that define seven different variant types. In general, there may be one or more variant types which can be specified uniquely for each combination of fixed-definition variant types for the item. By way of example, a given item may have a different set of variant types for each combination of country and customer segment, or the same variant types but different variant type values. The dynamic item data structure 200 identifies each unique combination of values by its corresponding global ID. It is also noted that the variant types may operate on the basis of an implied parent-child relationship. For example, in dynamic item data structure 200 the Medium size option is only available in the US if the color Blue is chosen.

In at least some example embodiments, different dynamic item data structures may be configured for a plurality of items, and the fixed-definition variant types may be common to all of the items. As such, the global ID may be used to define dimensions of a request that are common throughout the entire organization, thus allowing a single item to be reused globally. In some examples, the fixed-definition variant types may be used when there is a high cardinality of variant types.

Additionally, it is noted that the dynamic item data structure 200 is configurable to allow any quantity of additional variant types to be specified for an item and global ID combination, thus providing potentially limitless extensibility. When a point in an end-to-end process is reached where one or more of the variant type value selections need to be displayed, consumed, or used in some logic, then the variant type-variant type value pairs are retrieved as a collection from a source based on the pair of IDs. As a non-limiting example, in FIG. 2 the variant type-variant type value pairs for item ID "123456" and global ID "20202" may be retrieved as the following collection:

{
"item number":"123456",
"variant": [
  {
    "global id":"20202",
    "country": "US",
    "segment":"PublicSector",
    "color":"Blue",
    "size":"Medium"
  }
]
}

Accordingly, each variant type and variant type value may be considered master data, and individual systems may implement logic based on specific types and values. Further, in at least some examples, the global IDs can be used to identify a unique price or set of tiered list prices (and cost prices) for each combination to support, for example, maintenance of price and cost, coupled to a request definition as part of the master data.

When a dynamic item data structure has been configured, the entire set of variant type value selections can be encapsulated in the item ID-global ID pair for request processing and data integration between systems.

As such, the data model allows for a single item to be defined with potentially unlimited combinations of attributes and their values according to the context and relevant parameters. Adding new variants of an item and extending the scope of variation of an item can both be achieved with reduced (e.g., minimal) data operations and the resulting data structure is easier to maintain. Additionally, the dual item ID-global ID concept enables each instance of a configured item and its variant to be consumed through software processing stacks consisting of heterogenous systems. Each system may send and consume a pair of IDs which can be decoded to reveal the full extent of the item variant's definition as a data collection.

FIGS. 3A and 3B show an example graphical user interface (GUI) 300 and a corresponding dynamic item data structure 320, respectively, in an illustrative embodiment. More specifically, the GUI 300 comprises various user interface elements to configure a request for a quote for a storage service based on selection of a customer; a product; a storage class (for example, how quickly the data can be retrieved); a maximum available storage capacity; and a duration of the commitment to the service.

In this example, a "Storage-as-a-Service—Prepaid" product is selected on the product drop-down menu 302. The corresponding item ID (i.e., 123456) is retrieved from the dynamic item data structure 320 from block 322. The configuration process updates the GUI with the retrieved item ID as indicated by user interface element 304.

Additionally, "Acme GmbH" is selected as the customer using user interface element 306. Based on the selection, a configuration context is determined. Specifically, the Customer Country is set to "DE" and the customer segment is set to "Enterprise," as indicated by user interface element 308. Based on this configuration context, the following subset of global IDs are selected: 10101, 20202, 30303, as indicated by block 324 of dynamic item data structure 320.

The drop-down menu element 310 corresponding to the storage class is populated with available values based on the selected subset of global IDs. In this example, each of the variant type values corresponding to the subset of global IDs in the dynamic item data structure 320 are set to 121111, which corresponds to value of "Standard" for the storage class, as indicated by blocks 326 and 328 in FIG. 3B.

Additionally, the user interface element 312 corresponding to the "Max Storage" attribute is configured using the selected subset of global IDs and the storage class value of standard. Specifically, the user interface element 312 is set with the available values 50 Tb, 100 Tb and 150 Tb as indicated by block 330 in FIG. 3B. In this example, the user selects 150 GB.

Additionally, a set of pricing tiers is determined based on the selected subset of global IDs as indicated by block 332 of FIG. 3B, and the user interface element 314 is configured with a unit of measurement (uom) equal to one month and with available values from 1 to 120 based on the set of pricing tiers.

In this example, the duration is set to 48 months using interface element 314, which triggers the pricing tier corresponding to 15151 and a list price of €120 as indicated by blocks 332 and 334. As such, the price for the request is calculated as: 48×€120=€5760, as shown by user interface element 316.

Figure 4:
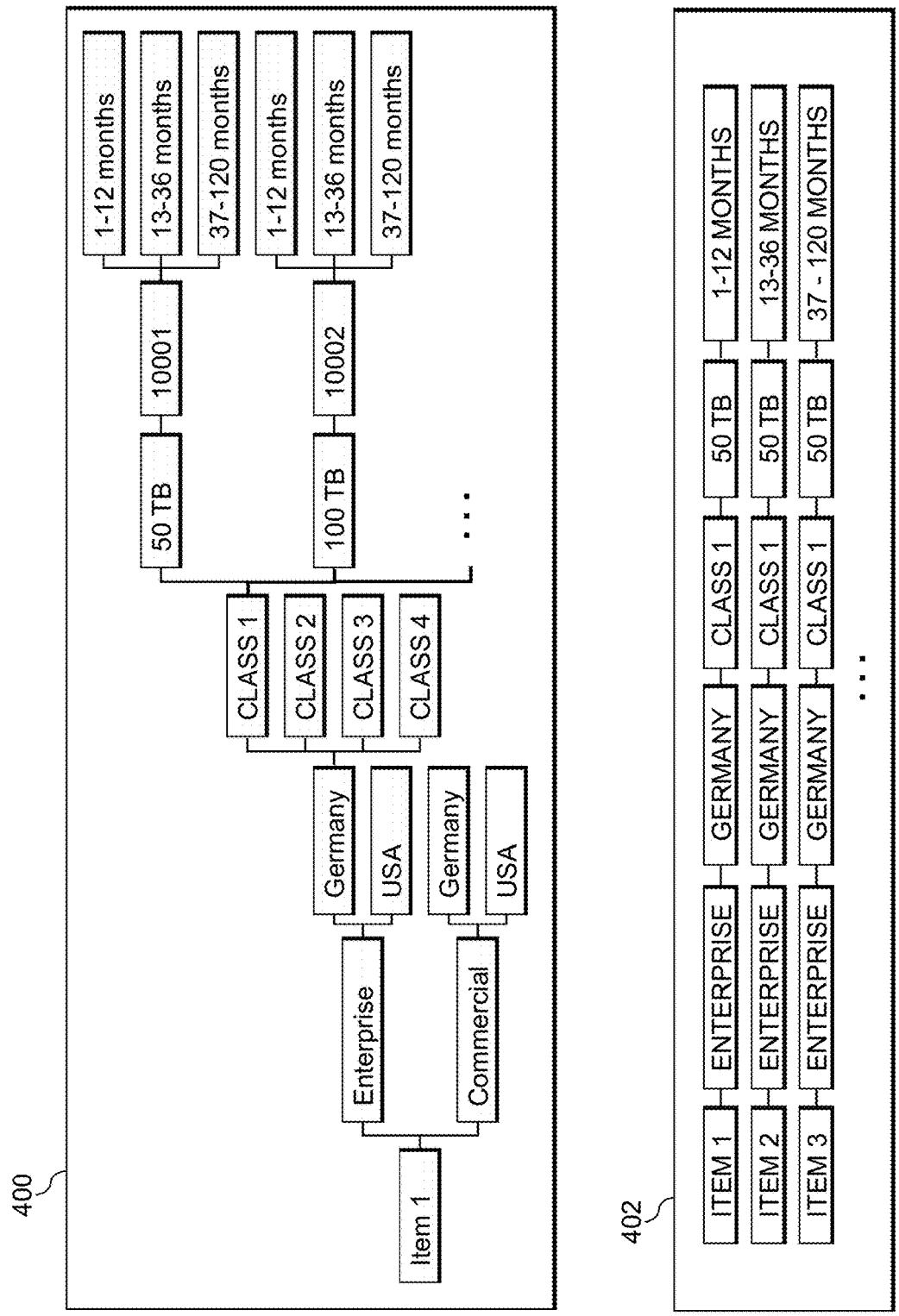
FIG. 4 shows a representation of a sample variation of a dynamic item data structure in accordance with an illustrative embodiment.

As another example, shown in FIG. 4, assume an item includes the following set of variables: a customer segment variable having two candidate values (Enterprise and Commercial); a supported country variable having two candidate values (Germany and USA); a storage class type variable with four candidate values (Class 1, Class 2, Class 3, Class 4); a maximum storage allowed variable with five candidate values (50 TB, 100 TB, 150 TB, 200 TB, 250 TB); and a duration of support variable with three candidate values (1-12 months, 13-36 months, 37-120 months). There are 240 possible variations of the item.

Referring again to FIG. 4, this figure shows a portion of a dynamic item data structure 400 in accordance with an illustrative embodiment that is configured to cover all 240 variations in the example above using a single item. Also shown in FIG. 4 is a plurality of conventional data structures 402 corresponding to the example above, where a different data structure is configured for each variation, thus requiring 240 different items.

Figure 5:
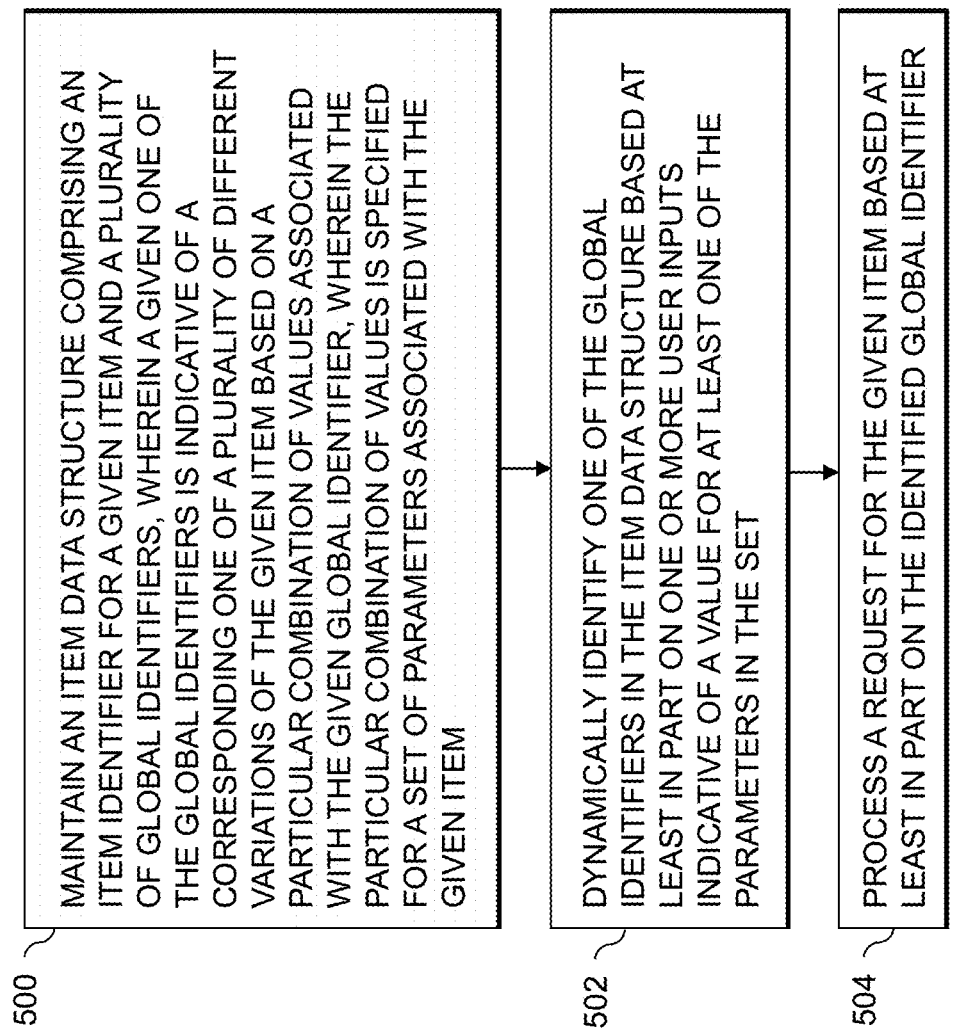
FIG. 5 shows a flow diagram for request processing using dynamic item data structures in an illustrative embodiment.

FIG. 5 is a flow diagram of a process for request processing using dynamic item data structures in an illustrative embodiment. It is to be understood that this particular process is only an example, and additional or alternative processes can be carried out in other embodiments.

In this embodiment, the process includes steps 500 through 504. These steps are assumed to be performed by the dynamic item processing system 105 utilizing its modules 112, 114 and 116.

Step 500 includes maintaining an item data structure comprising an item data structure comprising an item ID for a given item and a plurality of global IDs, wherein a given one of the global IDs is indicative of a corresponding one of a plurality of different variations of the given item based on a particular combination of values associated with the given global ID, wherein the particular combination of values is specified for a set of parameters associated with the given item. Step 502 includes dynamically identifying one of the global IDs in the item data structure based at least in part on one or more user inputs indicative of a value for at least one of the parameters in the set. Step 504 includes processing a request for the given item based at least in part on the identified global ID.

In at least one example embodiment, the processing of step 504 may include providing the item ID and the global ID corresponding to the identified global ID to an item processing module, such as a request processing tool. The item processing module may generate a line item based on the provided item ID and the global ID. The item processing module may decode the item ID and the identified global ID to obtain the corresponding particular combination of the values. The set of parameters may include one or more fixed-definition type parameters having candidate values that are fixed across a plurality of items. The one or more fixed-definition type parameters may correspond to one or more of: at least one geographical region and at least one type of user segment. The set of parameters may include one or more variable-definition type parameters having configurable values. The data structure may include a corresponding set of fields for the set of parameters. The one or more user inputs may be obtained via a graphical user interface, and the dynamically identifying of step 502 may include: performing, as the one or more user inputs are obtained: filtering the global IDs based on the value for the at least one parameter in the set; and updating one or more interface elements of the GUI based on the particular combinations of values corresponding to the filtered global IDs.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve the efficiency of creating and managing dynamic item data structures. These and other embodiments can effectively overcome problems associated with existing data structures that are based on a BOM model, for example.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
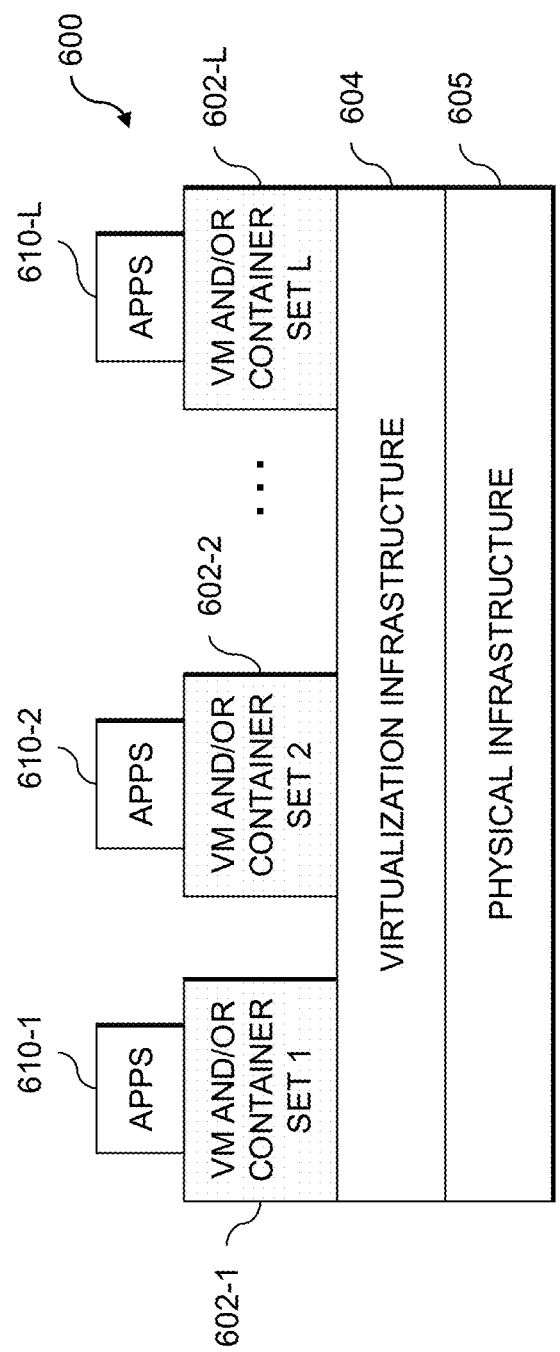
FIGS. 6 and 7 show examples of processing platforms that may be utilized to implement at least a portion of an information processing system in illustrative embodiments.
Figure 7:
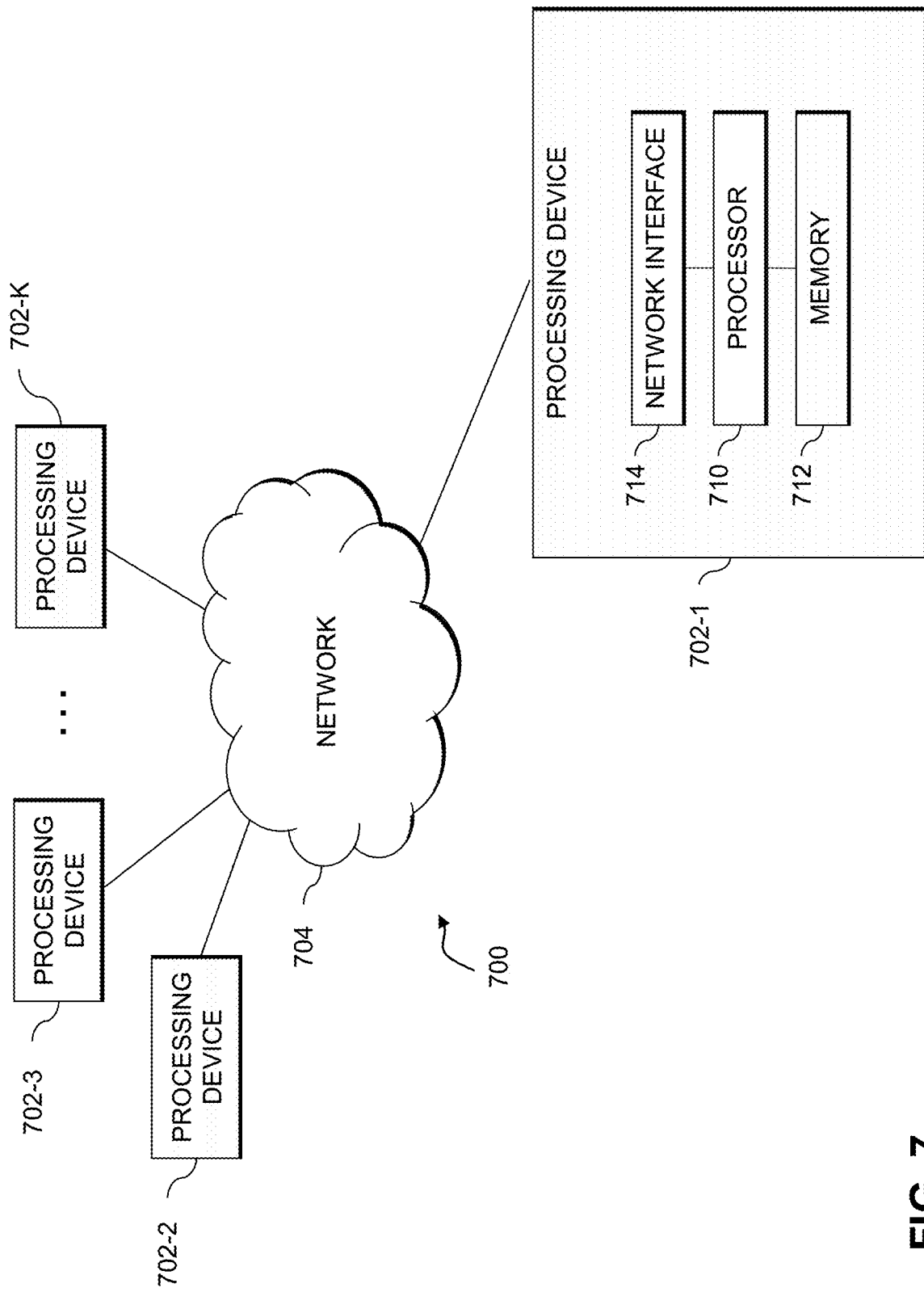

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an ASIC, an FPGA or other type of processing circuitry, as well as portions or combinations of such circuitry elements.

The memory 712 comprises RAM, ROM or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    maintaining an item data structure comprising an item identifier for a given item and a plurality of global identifiers, wherein a given one of the global identifiers is indicative of a corresponding one of a plurality of different variations of the given item based on a particular combination of values associated with the given global identifier, wherein the particular combination of values is specified for at least a first subset of a set of parameters associated with the given item, wherein another particular combination of values, associated with another one of the global identifiers, is specified for at least a second subset of the set of parameters, wherein the first and the second subsets have at least one different parameter;
    dynamically identifying one of the global identifiers in the item data structure based at least in part on one or more user inputs indicative of a value for at least one of the parameters in the set; and
    processing a request for the given item based at least in part on the identified global identifier;
    wherein the method is performed by at least one processing device comprising a processor coupled to a memory.

2. The computer-implemented method of claim 1, wherein said processing comprises:
    providing the item identifier and the global identifier corresponding to the identified global identifier to an item processing module.

3. The computer-implemented method of claim 2, wherein the item processing module generates a line item based on the provided item identifier and the global identifier.

4. The computer-implemented method of claim 2, wherein the item processing module decodes the item identifier and the identified global identifier to obtain the corresponding particular combination of the values.

5. The computer-implemented method of claim 1, wherein the set of parameters comprises one or more fixed-definition type parameters having candidate values that are fixed across a plurality of items.

6. The computer-implemented method of claim 5, wherein the one or more fixed-definition type parameters correspond to one or more of: at least one geographical region and at least one type of user segment.

7. The computer-implemented method of claim 1, wherein the set of parameters comprises one or more variable-definition type parameters having configurable values.

8. The computer-implemented method of claim 1, wherein the item data structure comprises a corresponding set of fields for the set of parameters.

9. The computer-implemented method of claim 1, wherein the one or more user inputs are obtained via a graphical user interface, and wherein said dynamically identifying comprises:
    performing, as the one or more user inputs are obtained:
        filtering the global identifiers based on the value for the at least one parameter in the set; and
        updating one or more interface elements of the graphical user interface based on the particular combinations of values corresponding to the filtered global identifiers.

10. The computer-implemented method of claim 1, wherein the given item corresponds to a configurable software service.

11. A non-transitory processor-readable storage medium having stored therein program code of one or more software programs, wherein the program code when executed by at least one processing device causes the at least one processing device:
    to maintain an item data structure comprising an item identifier for a given item and a plurality of global identifiers, wherein a given one of the global identifiers is indicative of a corresponding one of a plurality of different variations of the given item based on a particular combination of values associated with the given global identifier, wherein the particular combination of values is specified for at least a first subset of a set of parameters associated with the given item, wherein another particular combination of values, associated with another one of the global identifiers, is specified for at least a second subset of the set of parameters, wherein the first and the second subsets have at least one different parameter;
    to dynamically identify one of the global identifiers in the item data structure based at least in part on one or more user inputs indicative of a value for at least one of the parameters in the set; and
    to process a request for the given item based at least in part on the identified global identifier.

12. The non-transitory processor-readable storage medium of claim 11, wherein said processing comprises:

providing the item identifier and the global identifier corresponding to the identified global identifier to an item processing module.

13. The non-transitory processor-readable storage medium of claim 12, wherein the item processing module generates a line item based on the provided item identifier and the global identifier.

14. The non-transitory processor-readable storage medium of claim 12, wherein the item processing module decodes the item identifier and the identified global identifier to obtain the corresponding particular combination of the values.

15. The non-transitory processor-readable storage medium of claim 11, wherein the set of parameters comprises one or more fixed-definition type parameters having candidate values that are fixed across a plurality of items, and wherein the one or more fixed-definition type parameters correspond to one or more of: at least one geographical region and at least one type of user segment.

16. The non-transitory processor-readable storage medium of claim 11, wherein the set of parameters comprises one or more variable-definition type parameters having configurable values.

17. The non-transitory processor-readable storage medium of claim 11, wherein the one or more user inputs are obtained via a graphical user interface, and wherein said dynamically identifying comprises:
performing, as the one or more user inputs are obtained:
filtering the global identifiers based on the value for the at least one parameter in the set; and
updating one or more interface elements of the graphical user interface based on the particular combinations of values corresponding to the filtered global identifiers.

18. An apparatus comprising:
at least one processing device comprising a processor coupled to a memory;
the at least one processing device being configured:
to maintain an item data structure comprising an item identifier for a given item and a plurality of global identifiers, wherein a given one of the global identifiers is indicative of a corresponding one of a plurality of different variations of the given item based on a particular combination of values associated with the given global identifier, wherein the particular combination of values is specified for at least a first subset of a set of parameters associated with the given item, wherein another particular combination of values, associated with another one of the global identifiers, is specified for at least a second subset of the set of parameters, wherein the first and the second subsets have at least one different parameter;
to dynamically identify one of the global identifiers in the item data structure based at least in part on one or more user inputs indicative of a value for at least one of the parameters in the set; and
to process a request for the given item based at least in part on the identified global identifier.

19. The apparatus of claim 18, wherein said processing comprises:
providing the item identifier and the global identifier corresponding to the identified global identifier to an item processing module.

20. The apparatus of claim 18, wherein the set of parameters comprises at least one of: one or more fixed-definition type parameters having candidate values that are fixed across a plurality of items and one or more variable-definition type parameters having configurable values.

* * * * *